(12) United States Patent
Elkayam (10) Patent No.: US 11,090,740 B2
(45) Date of Patent: Aug. 17, 2021

(54) ROTARY CUTTING BODY HAVING INSERT POCKET WITH SEAT SURFACE PROVIDED WITH A PLURALITY OF ABUTMENT ELEMENTS AND ROTARY CUTTING TOOL

(71) Applicant: Iscar, Ltd., Tefen (IL)

(72) Inventor: Sagi Elkayam, Kiryat Bialik (IL)

(73) Assignee: Iscar, Ltd., Tefen (IL)

( * ) Notice: Subject to any disclaimer, the term of this patent is extended or adjusted under 35 U.S.C. 154(b) by 326 days.

(21) Appl. No.: 16/273,775

(22) Filed: Feb. 12, 2019

(65) Prior Publication Data

US 2020/0254540 A1 Aug. 13, 2020

(51) Int. Cl.
   *B23P 15/34* (2006.01)
   *B23B 27/16* (2006.01)
   (Continued)

(52) U.S. Cl.
   CPC .............. *B23C 5/2208* (2013.01); *B23C 5/06* (2013.01); *B23C 2200/0438* (2013.01); *B23C 2200/161* (2013.01); *B23C 2200/164* (2013.01); *B23C 2200/165* (2013.01); *B23C 2200/361* (2013.01); *B23C 2210/165* (2013.01);
   (Continued)

(58) Field of Classification Search
   CPC ...... B23C 2200/0438; B23C 2200/161; B23C 2200/164; B23C 2210/202; B23C 2210/204; B23C 2200/165; B23C 2250/08; B23C 2210/168; B23C 2200/361;
   (Continued)

(56) References Cited

U.S. PATENT DOCUMENTS 3,629,919 A * 12/1971 Trevarrow, Jr. ......... B23B 27/06
407/103
4,209,047 A 6/1980 Weill
(Continued)

FOREIGN PATENT DOCUMENTS

DE 10 2017 000784 8/2018
WO WO-2009083952 A1 * 7/2009 ........... B23C 5/2221

OTHER PUBLICATIONS

International Search Report dated May 15, 2020, issued in PCT counterpart application (No. PCT/IL2020/050081).
(Continued)

*Primary Examiner* — Sara Addisu
(74) *Attorney, Agent, or Firm* — Womble Bond Dickinson (US) LLP (57) ABSTRACT

A cutting body rotatable about a tool axis has an insert receiving pocket with a seat surface at an axial forward end thereof. The seat surface has a plurality of abutment elements, including an axial abutment element having an axially forward facing abutment surface and at least one radial abutment element. In a top view of the insert receiving pocket, the axially forward facing abutment surface forms an external acute clamping angle with a radially outward facing pocket wall. A rotary cutting tool includes the cutting body, and a cutting insert removably secured in the insert receiving pocket, having a base surface in contact with the seat surface. The at least one radial abutment element occupies or is occupied by at least one radial abutting element of the base surface, and the axially forward facing abutment surface is in contact with an axial abutting surface of the base surface.

24 Claims, 6 Drawing Sheets

(51) Int. Cl.
*B23C 5/22* (2006.01)
*B23C 5/06* (2006.01)

(52) U.S. Cl.
CPC .. *B23C 2210/168* (2013.01); *B23C 2210/202* (2013.01); *B23C 2210/405* (2013.01)

(58) Field of Classification Search
CPC . B23C 2210/165; B23C 5/109; B23C 5/2208; B23C 5/2221; B23C 5/06
See application file for complete search history.

(56) References Cited

U.S. PATENT DOCUMENTS

| | | | |
|---|---|---|---|
| 5,542,795 A | 8/1996 | Mitchell | |
| 5,716,167 A * | 2/1998 | Siddle | B23C 5/241 |
| | | | 407/36 |
| 5,810,518 A * | 9/1998 | Wiman | B23B 27/065 |
| | | | 407/102 |
| 5,820,310 A | 10/1998 | Boianjiu | |
| 5,924,826 A | 7/1999 | Byström et al. | |
| 5,931,613 A * | 8/1999 | Larsson | B23B 27/08 |
| | | | 407/103 |
| 5,944,456 A | 8/1999 | Shirley et al. | |
| 6,146,061 A | 11/2000 | Larsson | |
| 6,413,021 B1 * | 7/2002 | Koch | B23D 77/025 |
| | | | 407/43 |
| 6,834,692 B2 * | 12/2004 | Lindsay | B23C 5/207 |
| | | | 144/208.8 |
| 6,840,716 B2 | 1/2005 | Morgulis et al. | |
| 7,201,545 B2 * | 4/2007 | Ejderklint | B23B 27/1611 |
| | | | 407/101 |
| 7,510,354 B2 * | 3/2009 | Andersson | B23C 5/06 |
| | | | 407/101 |
| 7,578,641 B2 * | 8/2009 | Andersson | B23C 5/2208 |
| | | | 407/103 |
| 7,670,088 B2 * | 3/2010 | Andersson | B23C 5/2208 |
| | | | 407/33 |
| 7,819,610 B2 * | 10/2010 | Wallstrom | B23C 5/2213 |
| | | | 407/113 |
| 7,922,427 B2 * | 4/2011 | Spitzenberger | B23C 5/006 |
| | | | 407/104 |
| 8,313,270 B2 * | 11/2012 | Hecht | B23C 5/2221 |
| | | | 407/113 |
| 8,596,933 B2 * | 12/2013 | Ryu | B23C 5/2221 |
| | | | 407/42 |
| 8,696,254 B2 * | 4/2014 | Satran | B23C 5/109 |
| | | | 407/34 |
| 10,350,688 B2 * | 7/2019 | Rue | B23C 5/22 |
| 2003/0017014 A1 * | 1/2003 | Morgulis | B23C 5/2221 |
| | | | 407/34 |
| 2006/0056925 A1 * | 3/2006 | Hecht | B23D 77/044 |
| | | | 407/37 |
| 2006/0056926 A1 | 3/2006 | Riviere et al. | |
| 2006/0140732 A1 * | 6/2006 | Hecht | B23B 51/08 |
| | | | 408/199 |
| 2006/0216121 A1 * | 9/2006 | Edler | B23B 27/1611 |
| | | | 407/104 |
| 2007/0292220 A1 * | 12/2007 | Sjoberg | B23B 27/1611 |
| | | | 407/66 |
| 2008/0181731 A1 | 7/2008 | Wallstrom et al. | |
| 2008/0304928 A1 * | 12/2008 | Engstrom | B23C 5/2247 |
| | | | 408/229 |
| 2010/0003090 A1 * | 1/2010 | Johansson | B23C 5/202 |
| | | | 407/113 |
| 2013/0330136 A1 | 12/2013 | Hecht | |
| 2014/0030038 A1 | 1/2014 | Hansson | |
| 2015/0016899 A1 * | 1/2015 | Baernthaler | B23G 5/005 |
| | | | 407/11 |
| 2015/0158090 A1 | 6/2015 | Hecht | |
| 2015/0158091 A1 | 6/2015 | Hecht | |
| 2016/0067805 A1 * | 3/2016 | Nickel | B23F 21/166 |
| | | | 407/25 |
| 2017/0368616 A1 * | 12/2017 | Rue | B23C 5/22 |
| 2018/0318944 A1 * | 11/2018 | Nguyen | B23C 5/006 |

OTHER PUBLICATIONS

Written Opinion dated May 15, 2020, issued in PCT counterpart application (No. PCT/IL2020/050081).

* cited by examiner

FIG.10b

ROTARY CUTTING BODY HAVING INSERT POCKET WITH SEAT SURFACE PROVIDED WITH A PLURALITY OF ABUTMENT ELEMENTS AND ROTARY CUTTING TOOL

FIELD OF THE INVENTION

The present invention relates to a rotary cutting body having a plurality of abutment elements associated with a seat surface of an insert receiving pocket, and a rotary cutting tool having such cutting body, for use in metal cutting processes in general, and for ramp down milling operations and high speed milling operations in particular.

BACKGROUND OF THE INVENTION

Within the field of cutting tools used in milling operations, there are some examples of a cutting body having at least one abutment element on a seat surface of an insert receiving pocket. U.S. Pat. No. 5,542,795 discloses a milling cutter for performing plunge and face cutting operations on a workpiece with cutting inserts having different side and transverse cutting edges. A cutter body has a plurality of recessed insert seats for securably receiving the inserts, including a top shoulder spaced apart from the transverse cutting edges of the inserts for allowing the insert seat to receive inserts having transverse edges of different shapes, and a support structure for preventing relative movement between the cutting inserts and their respective seats along the side and transverse insert edges. In the preferred embodiment, the support structure includes a rail-like projection extending out of the back face of the cutting inserts that is substantially parallel to the side cutting edges of the insert, and a complementarily-shaped slot in the bottom wall of the seat, in combination with a shoulder formed in the insert seat near but spaced apart from the top shoulder of the seat, and a complementary recess in the insert substantially parallel to its transverse cutting edges.

U.S. Pat. No. 6,840,716 discloses a milling tool having an insert holder provided with an insert receiving pocket and at least one cutting insert mounted therein. The insert receiving pocket has a longitudinally extending inner wall, a rear wall adjacent the inner wall and a lower wall adjacent the inner wall and the rear wall. A front end of the lower wall protrudes forwardly with respect to a central portion of the insert holder. A front protrusion rises upwardly from the lower wall and extends inwardly and rearwardly from a periphery of the insert holder. The front protrusion has a front surface perpendicular to the lower wall. A groove formed in the bottom surface of the cutting insert has a distal side wall perpendicular to the bottom surface. When assembled, a radial abutment surface of the cutting insert abuts a radial abutment surface of the insert receiving pocket, the front surface of the front protrusion abuts the front distal side wall of the groove and a rear portion of the one cutting insert is spaced from the rear wall of the insert receiving pocket.

It is an object of the present invention to provide an improved rotary cutting body.

It is also an object of the present invention to provide an improved rotary cutting tool, having a cutting insert removably secured in the cutting body with a high level of stability.

It is a further object of the present invention to provide an improved rotary cutting tool, particularly suitable for ramp down milling operations and high speed milling operations.

SUMMARY OF THE INVENTION

In accordance with the present invention, there is provided a rotary cutting body having a tool axis about which the cutting body is rotatable in a direction of rotation, comprising:

at least one insert receiving pocket provided at an axial forward end of the cutting body, the insert receiving pocket having:

a seat surface facing in the direction of rotation and including a threaded bore having a bore axis, a radially outward facing pocket wall transverse to the seat surface, the pocket wall having a wall edge spaced apart from the seat surface, a first plane which is tangential to the wall edge, perpendicular to the seat surface and intersects the axial forward end of the cutting body, and a plurality of male and/or female abutment elements associated with the seat surface and including:

an axial abutment element having an axially forward facing abutment surface, the axially forward facing abutment surface having an axial abutment edge, and at least one radial abutment element having a radially inward facing abutment surface, wherein in a top view of the insert receiving pocket:

the axial abutment edge forms an external acute clamping angle with the first plane.

Also, in accordance with the present invention, there is provided a rotary cutting tool comprising:

a rotary cutting body of the sort described above, and at least one cutting insert removably secured in the at least one insert receiving pocket, the cutting insert comprising opposing upper and lower surfaces with a peripheral side surface extending therebetween, and a through bore intersecting the upper and lower surfaces having an insert axis, at least one cutting edge formed at the intersection of the upper surface and the peripheral side surface, and the lower surface having a base surface and a plurality of male and/or female abutting elements associated with the base surface, the plurality of abutting elements including at least one axial abutting element and at least one radial abutting element, a clamping screw passing through the through bore and threadingly engaging the threaded bore, wherein:

the insert's base surface is in contact with the seat surface;

the at least one radial abutment element occupies or is occupied by the at least one radial abutting element; and the axially forward facing abutment surface is in contact with a corresponding axial abutting surface of one of the at least one axial abutting element.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

As shown in FIGS. 1 to 4, one aspect of the present invention relates to a rotary cutting body 20 rotatable in a direction of rotation R about a tool axis AT, and having at least one insert receiving pocket 22 at an axial forward end 24 thereof.

The insert receiving pocket 22 has a seat surface 26 facing in the direction of rotation R, a radially outward facing pocket wall 28 transverse to the seat surface 26, and a plurality of male and/or female abutment elements 30; 32a, 32b associated with the seat surface 26. The radially outward facing pocket wall 28 has an upper wall edge 48 spaced apart from the seat surface 26.

It should be appreciated that use of the term "associated with", throughout the description and claims, with respect to the plurality of male and/or female abutment elements 30; 32a, 32b and the seat surface 26, covers the possibility of the plurality of male abutment elements 30; 32a, 32b being disposed on (i.e., protruding from) the seat surface 26 and also the possibility of the plurality of female abutment elements 30; 32a, 32b being disposed in (i.e., recessed into) the seat surface 26.

In some embodiments of the present invention, the insert receiving pocket 22 may have an axially forward facing pocket wall 34 transverse to the seat surface 26 and spaced apart from the radially outward facing pocket wall 28.

Figure 2:
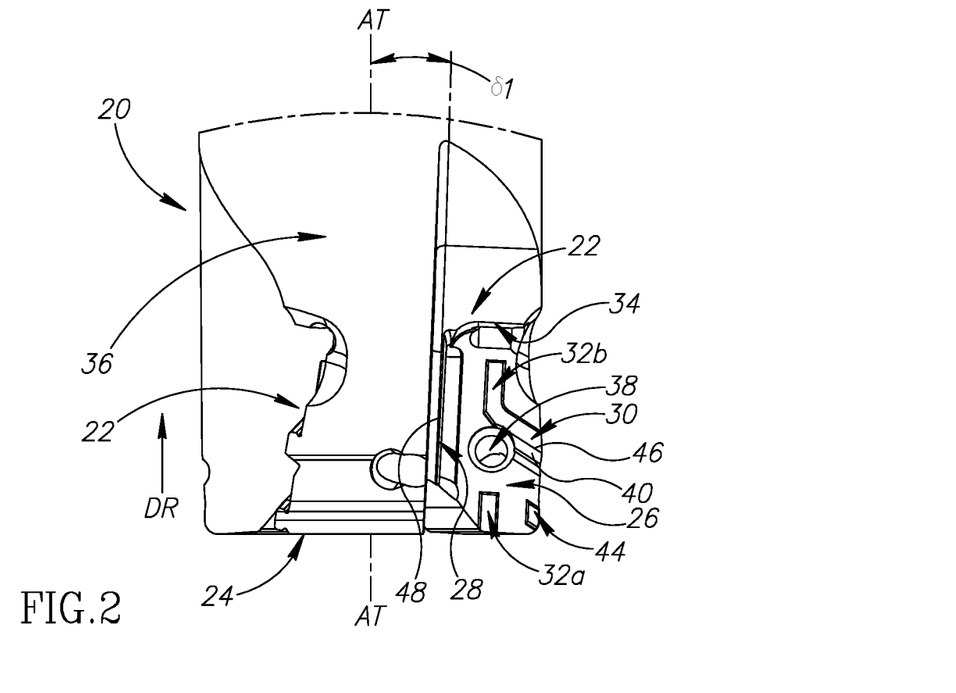
FIG. 2 is a first side view of the rotary cutting body shown in FIG. 1.
Figure 3:
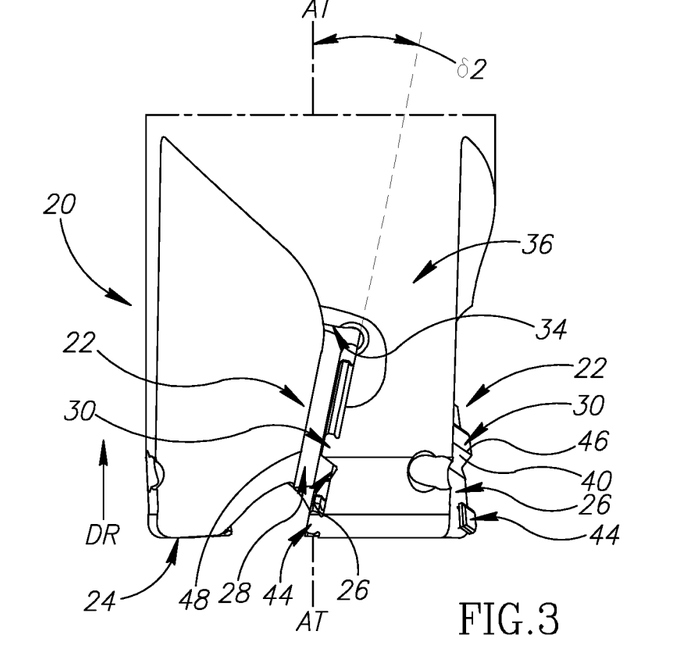
FIG. 3 is a second side view of the rotary cutting body shown in FIG. 1.

Also, in some embodiments of the present invention, as shown in FIGS. 2 and 3, the axially forward facing pocket wall 34 may be entirely located axially rearward of the plurality of male and/or female abutment elements 30; 32a, 32b.

Figure 1:
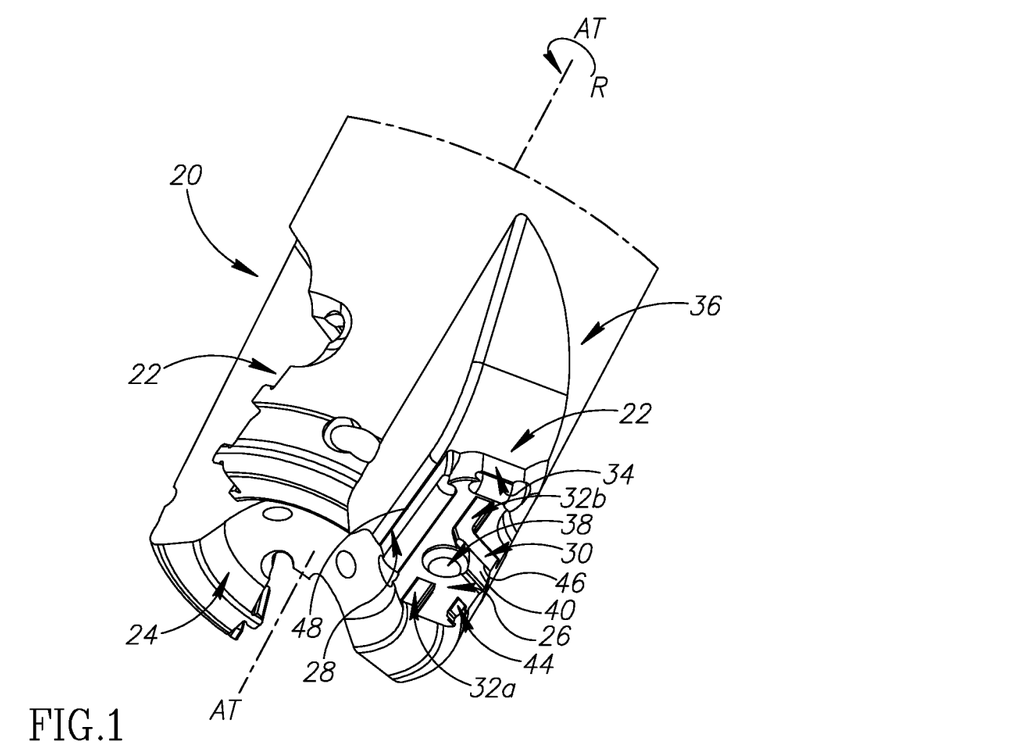
FIG. 1 is a perspective view of a rotary cutting body in accordance with some embodiments of the present invention.

Further, in some embodiments of the present invention, the rotary cutting body 20 may be cylindrical shaped, having a circumferential wall 36 extending in an axial rearward direction DR from the axial forward end 24.

Figure 4:
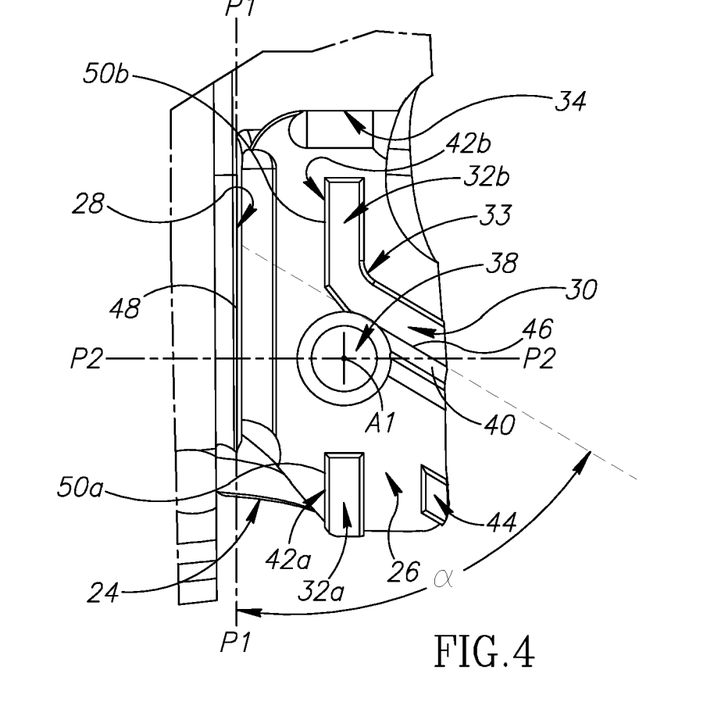
FIG. 4 is a top view of an insert receiving pocket of the rotary cutting body shown in FIG. 1.

As shown in FIG. 4, the seat surface 26 includes a threaded bore 38 having a bore axis A1.

In some embodiments of the present invention, the seat surface 26 may be planar.

Also, in some embodiments of the present invention, the bore axis A1 may be perpendicular to the seat surface 26.

As shown in FIG. 4, the plurality of abutment elements 30; 32a, 32b include an axial abutment element 30 having an axially forward facing abutment surface 40 and at least one radial abutment element 32a, 32b having a radially inward facing abutment surface 42a, 42b.

In some embodiments of the present invention, the plurality of abutment elements 30; 32a, 32b may be elongated, and the axial abutment element 30 may be transverse to the at least one radial abutment element 32a, 32b.

Also, in some embodiments of the present invention, the plurality of abutment elements 30; 32a, 32b may be male-type elements, for example, in the form of ribs or ridges.

Further, in some embodiments of the present invention, the plurality of abutment elements 30; 32a, 32b may include two spaced apart radial abutment elements 32a, 32b, a forward radial abutment element 32a and a rearward radial abutment element 32b. Each radial abutment element 32a, 32b may have a respective forward or rearward radially inward facing abutment surface 42a, 42b.

Yet further, in some embodiments of the present invention, the axially forward facing abutment surface 40 may intersect the circumferential wall 36.

It should be appreciated that in some embodiments of the present invention, the plurality of abutment elements 30; 32a, 32b may only include a single axial abutment element 30. As shown in FIG. 4, in addition to the plurality of abutment elements 30; 32a, 32b, the seat surface 26 may include a knob 44 protruding therefrom. The knob 44 is spaced apart from all of the plurality of abutment elements 30; 32a, 32b.

In some embodiments of the present invention, the knob 44 may be contiguous with the circumferential wall 36.

According to the present invention, in a top view of the insert receiving pocket 22, as shown in FIG. 4:

an axial abutment edge 46 of the axially forward facing abutment surface 40 forms an external acute clamping angle α with a first plane P1 tangential to the wall edge 48 of the radially outward facing pocket wall 28 and intersecting the axial forward end 24.

In some embodiments of the present invention, in the top view of the insert receiving pocket 22, the axial abutment edge 46 may extend linearly along the axial abutment element 30.

Also, in some embodiments of the present invention, in the top view of the insert receiving pocket 22, the wall edge 48 may be linear, and the first plane P1 may contain the wall edge 48.

It should be appreciated that in some embodiments of the present invention, the top view of the insert receiving pocket 22 may be taken perpendicular to the seat surface 26, and the first plane P1 may be perpendicular to the seat surface 26.

In some embodiments of the present invention, the clamping angle α may be at least 45 degrees and at most 75 degrees.

It should be appreciated that use of the term "external angle" throughout the description and claims refers to an angle between two surface components as measured external to the member on which these components are formed.

In some embodiments of the present invention, in the top view of the insert receiving pocket 22, as shown in FIG. 4, the bore axis A1 may be located in the area of the seat surface 26 subtended by the clamping angle α.

It should be appreciated that for other embodiments of the present invention in which the bore axis A1 may not be perpendicular to the seat surface 26 (not shown), in the top view of the insert receiving pocket 22, the bore axis A1 may be considered to be located at the point of intersection of the bore axis A1 and an imaginary plane defined by the seat surface 26.

In some embodiments of the present invention, as shown in FIG. 4, the knob 44 may be located in the area of the seat surface 26 subtended by the clamping angle α.

As shown in FIG. 4, in the top view of the insert receiving pocket 22, the axially forward facing abutment surface 40 may be entirely located further from the first plane P1 than the bore axis A1.

Also, as shown in FIG. 4, in the top view of the insert receiving pocket 22, the axially forward facing abutment surface 40 may intersect the threaded bore 38.

Further, as shown in FIG. 4, in the top view of the insert receiving pocket 22, the at least one radially inward facing abutment surface 42a, 42b may be entirely located closer to the first plane P1 than the bore axis A1.

Yet further, as shown in FIG. 4, in the top view of the insert receiving pocket 22, at least one radial abutment edge 50a, 50b of the at least one radially inward facing abutment surface 42a, 42b may be parallel to the first plane P1.

In some embodiments of the present invention, in the top view of the insert receiving pocket 22, the at least one radial abutment edge 50a, 50b may extend linearly along its respective radial abutment element 32a, 32b.

As shown in FIG. 2, in a first side view of the rotary cutting body 20, the wall edge 48 of the radially outward facing pocket wall 28 may form a zero or acute first pocket angle δ1 with the tool axis AT, and the first pocket angle δ1 may be less than 15 degrees.

As shown in FIG. 3, in a second side view of the rotary cutting body 20, the seat surface 26 may form a zero or acute second pocket angle δ2 with the tool axis AT, and the second pocket angle δ2 may be less than 30 degrees.

For embodiments of the present invention in which the plurality of abutment elements 30; 32a, 32b include two spaced apart radial abutment elements 32a, 32b, in the top view of the insert receiving pocket 22, as shown in FIG. 4, the two radial abutment elements 32a, 32b and their respective radially inward facing abutment surfaces 42a, 42b may be entirely located on opposite sides of a second plane P2 perpendicular to the first plane P1 and intersecting the threaded bore 38.

In some embodiments of the present invention, the second plane P2 may contain the bore axis A1.

Also, in some embodiments of the present invention, the forward radial abutment element 32a may intersect the axial forward end 24, and the rearward radial abutment element 32b may intersect the axial abutment element 30.

As seen in these figures, the elongated axial abutment element 30 and the elongated rearward radial abutment element 32b intersect at an obtuse angle to form a continuous boomerang-shaped rib 33 on which are formed both the axially forward facing abutment surface 40 and the rearward radially inward facing abutment surface 42b. In embodiments where the rearward radially inward facing abutment surface 42b is parallel to the first plane P1, the axially forward facing abutment surface 40 also forms an external acute clamping angle α with the rearward radially inward facing abutment surface 42b. The insert receiving pocket 22 seen in FIGS. 4 and 5 has male-type abutment elements 30, 32a, 32b. It is understood, however, that in other embodiments a female axial abutment element and a female rearward radial abutment element may intersect to form a continuous boomerang-shaped groove.

Figure 5:
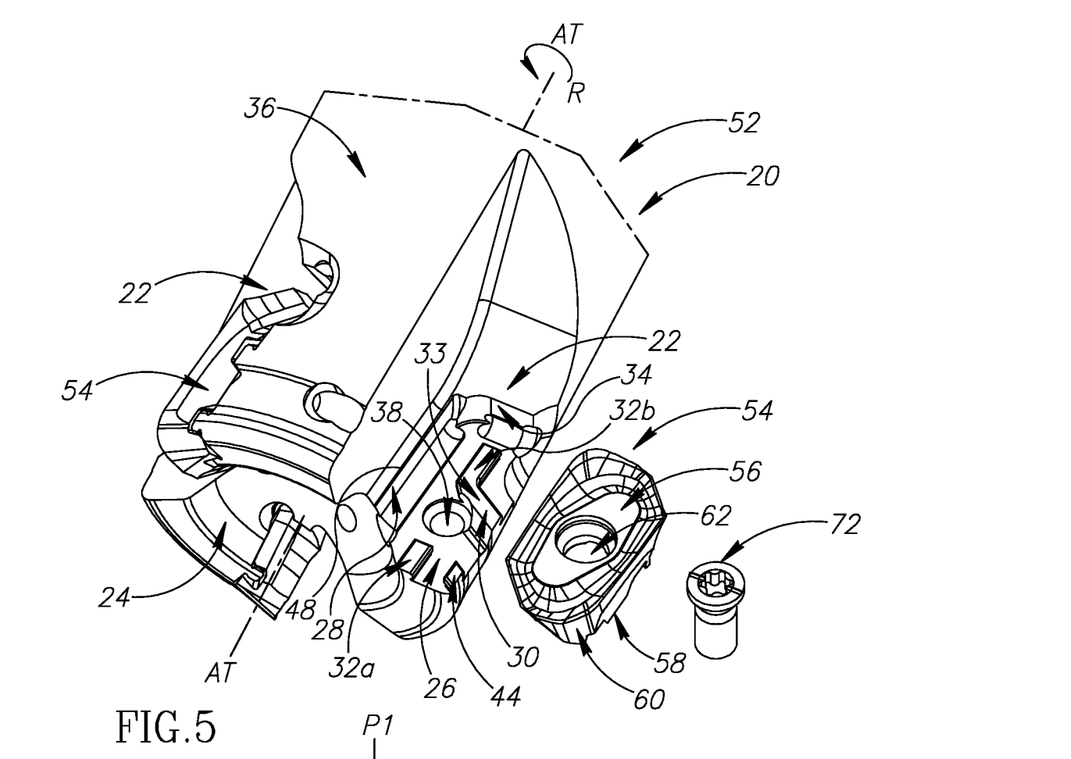
FIG. 5 is an exploded perspective view of a cutting tool in accordance with some embodiments of the present invention.
Figure 6:
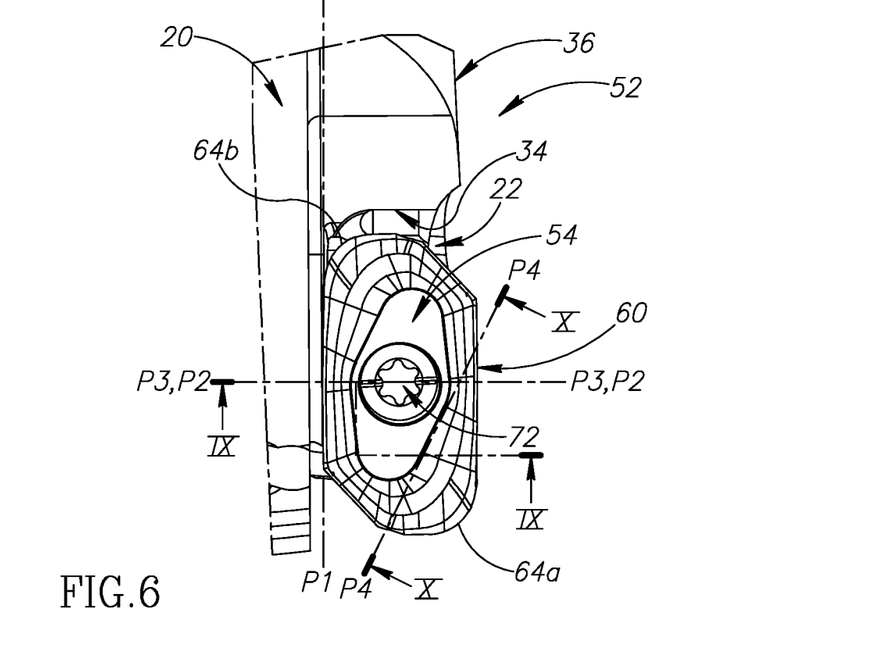
FIG. 6 is a top view of the insert receiving pocket of the cutting tool shown in FIG. 5.

As shown in FIGS. 5 and 6, another aspect of the present invention relates to a rotary cutting tool 52 having least one cutting insert 54 removably secured in the at least one insert receiving pocket 22 of the rotary cutter body 20.

In some embodiments of the present invention, a plurality of cutting inserts 54 may be removably secured in an equal number of insert receiving pockets 22.

Also, in some embodiments of the present invention, the rotary cutting tool 52 may be a milling tool.

As shown in FIGS. 5 to 8, the cutting insert 54 may have opposing upper and lower surfaces 56, 58 with a peripheral side surface 60 extending therebetween, and a through bore 62 intersecting the upper and lower surfaces 56, 58 having an insert axis A2. The peripheral side surface 60 may comprise a pair of opposite end surfaces 75 connected to one another by a pair of opposite side surfaces 77.

In some embodiments of the present invention, the cutting insert 54 may preferably be manufactured by form pressing and sintering a cemented carbide, such as tungsten carbide, and may be coated or uncoated.

Also, in some embodiments of the present invention, the upper and lower surfaces 56, 58 may differ from one another.

As shown in FIGS. 5 to 8, at least one cutting edge 64a, 64b may be formed at the intersection of the upper surface 56 and the peripheral side surface 60.

In some embodiments of the present invention, the cutting insert 54 may have two spaced apart cutting edges 64a, 64b, and the cutting insert 54 may be indexable about the insert axis A2. Also, in some embodiments of the present invention, the cutting insert 54 may exhibit 2-fold rotational symmetry about the insert axis A2.

By virtue of no cutting edges being formed at the intersection of the lower surface 58 and the peripheral side surface 60, the cutting insert 54 may be termed as 'single-sided' or 'non-reversible'.

Figure 7:
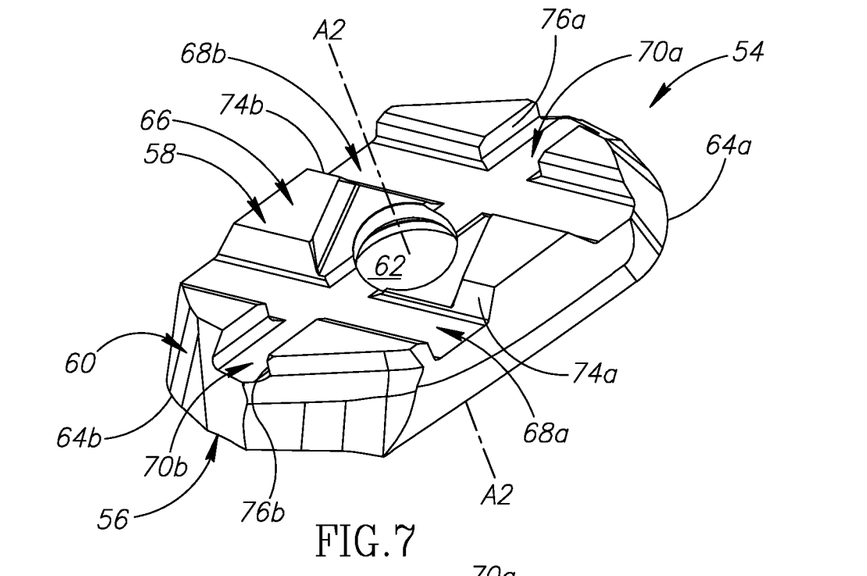
FIG. 7 is a perspective view of a cutting insert of the cutting tool shown in FIG. 5.
Figure 8:
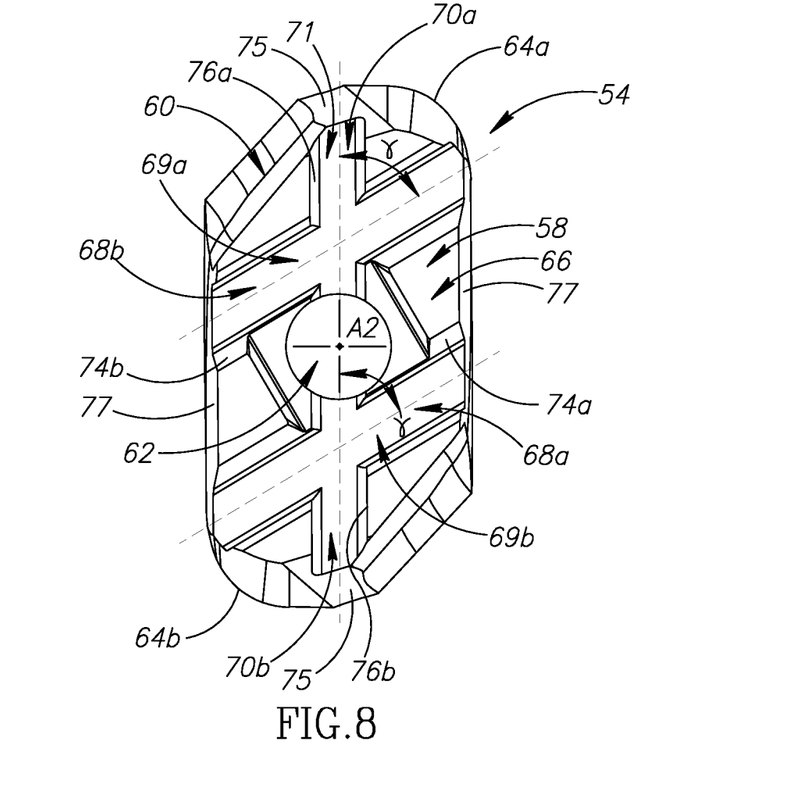
FIG. 8 is a bottom view of the cutting insert shown in FIG. 7.

As shown in FIGS. 7 and 8, the lower surface 58 may have a base surface 66 and a plurality of male and/or female abutting elements 68a, 68b; 70a, 70b associated with the base surface 66.

It should be appreciated that use of the term "associated with", throughout the description and claims, with respect to the plurality of male and/or female abutting elements 68a, 68b; 70a, 70b and the base surface 66, covers the possibility of the plurality of male abutting elements 68a, 68b; 70a, 70b being disposed on (i.e., protruding from) the base surface 66 and also the possibility of the plurality of female abutting elements 68a, 68b; 70a, 70b being disposed in (i.e., recessed into) the base surface 66.

In some embodiments of the present invention, the base surface 66 may be planar.

Also, in some embodiments of the present invention, the plurality of abutting elements 68a, 68b; 70a, 70b may include at least one axial abutting element 68a, 68b and at least one radial abutting element 70a, 70b.

Further, in some embodiments of the present invention, the plurality of abutting elements 68a, 68b; 70a, 70b may be elongated, and the at least one axial abutting element 68a, 68b may be transverse to the at least one radial abutting element 70a, 70b.

Yet further, in some embodiments of the present invention, the plurality of abutting elements 68a, 68b; 70a, 70b may be female-type elements, for example, in the form of grooves or channels.

It should also be appreciated that the provision of the plurality of female-type abutting elements 68a, 68b; 70a, 70b contributes in reducing the overall weight of the cutting insert 54, which is very important in high speed milling operations, in which the cutting insert 54 is subjected to high centrifugal forces.

As shown in FIGS. 6, 9a, 9b, 10a and 10b, in an assembled position of the rotary cutting tool 52:

a clamping screw 72 passes through the through bore 62 and threadingly engages the threaded bore 38;

the insert's base surface 66 is in contact with the seat surface 26;

the at least one radial abutment element 32a, 32b occupies or is occupied by the at least one radial abutting element 70a, 70b; and the axially forward facing abutment surface 40 is in contact with a corresponding axial abutting surface 74a, 74b of one of the at least one axial abutting element 68a, 68b.

In the assembled position of the rotary cutting tool 52, the axial abutting surface 74a, 74b in contact with the axially forward facing abutment surface 40 may be described as an operative axial abutting surface 74a, 74b.

It should be appreciated that only a single clamping screw 72 may participate with the mounting of the cutting insert 54 in its respective insert receiving pocket 22.

As shown in FIGS. 7 and 8, in some embodiments of the present invention, the plurality of abutting elements 68a, 68b; 70a, 70b may include two spaced apart axial abutting elements 68a, 68b.

In such embodiments of the invention, the axial abutting surface 74a, 74b of the axial abutting element 68a, 68b not in contact the axially forward facing abutment surface 40 may be described as a non-operative axial abutting surface 74a, 74b.

Also, in such embodiments of the invention, the non-operative axial abutting surface 74a, 74b may not be in contact with any surface of the insert receiving pocket 22.

For embodiments of the present invention in which the two spaced apart axial abutting elements 68a, 68b are female-type elements, a single male-type axial abutment element 30 may occupy a first of the two axial abutting elements 68a, 68b, and the knob 44 may occupy a second of the two axial abutting elements 68a, 68b.

As shown in FIG. 6, for embodiments of the present invention in which the cutting insert 54 has two spaced cutting edges 64a, 64b, and the cutting insert 54 is indexable about the insert axis A2, in the assembled position of the rotary cutting tool 52, only one of the two spaced cutting edges 64a, 64b may be described as an operative cutting edge 64a, 64b.

As shown in FIGS. 7 and 8, in some embodiments of the present invention, the plurality of abutting elements 68a, 68b; 70a, 70b may include two spaced apart radial abutting elements 70a, 70b.

For embodiments of the present invention in which the two spaced apart radial abutting elements 70a, 70b are female-type elements, two spaced apart male-type radial abutment elements 32a, 32b may occupy the two radial abutting elements 70a, 70b.

In the insert seen in FIGS. 7 and 8, the plurality of abutting elements 68a, 68b; 70a, 70b are female-type. Thus, the insert's lower surface 58 has a single longitudinal groove 71 recessed into the base surface 66, opening to the opposite end surfaces 75, passing through the through bore 62, and comprising the two spaced apart radial abutting elements 70a, 70b. The insert's base surface 66 has a pair of parallel transverse grooves 69a, 69b recessed into the base surface 66, each transverse groove 69a, 69b opening out to the opposite side surfaces 77, avoiding the through bore 62, and comprising a respective one of the radial abutting elements 68a, 68b. Importantly, the single longitudinal groove 71 intersects, and forms an acute groove angle γ with, each of the transverse grooves 69a, 69b. The acute groove angle γ is at least 45 degrees and at most 75 degrees.

In some embodiments of the present invention, the bore axis A1 may be non-coaxial with the insert axis A2.

It should be appreciated that for embodiments of the present invention in which the bore axis A1 is non-coaxial with the insert axis A2, the through bore 62 may be eccentric in relation to the threaded bore 38.

It should also be appreciated that the eccentric relationship of the through bore 62 in relation to the threaded bore 38 promotes contact between the radially outward facing pocket wall 28 and the insert's peripheral side surface 60 on tightening of the clamping screw 72.

It should be further appreciated that the eccentric relationship of the through bore 62 in relation to the threaded bore 38 promotes contact between the axially forward facing abutment surface 40 of the axial abutment element 30 and the axial abutting surface 74a, 74b of the one of the at least one axial abutting element 68a, 68b on tightening of the clamping screw 72.

For embodiments of the present invention in which the bore axis A1 is located in the area of the seat surface 26 subtended by the clamping angle α, it should be appreciated that the cutting insert 54 can be advantageously clamped in its respective insert receiving pocket 22 with a high level of stability.

Also, for embodiments of the present invention in which the clamping angle α is at least 45 degrees and at most 75 degrees, it should be appreciated that the cutting insert 54 can be advantageously clamped in its respective insert receiving pocket 22 with a high level of stability.

Further, for embodiments of the present invention in which, in the top view of the insert receiving pocket 22, the axially forward facing abutment surface 40 intersects the threaded bore 38, it should be appreciated that the cutting insert 54 can be advantageously clamped in its respective insert receiving pocket 22 with reduced level of rotational displacement about the bore axis A1 during milling operations, and particularly during ramp down milling operations.

Figure 9A:
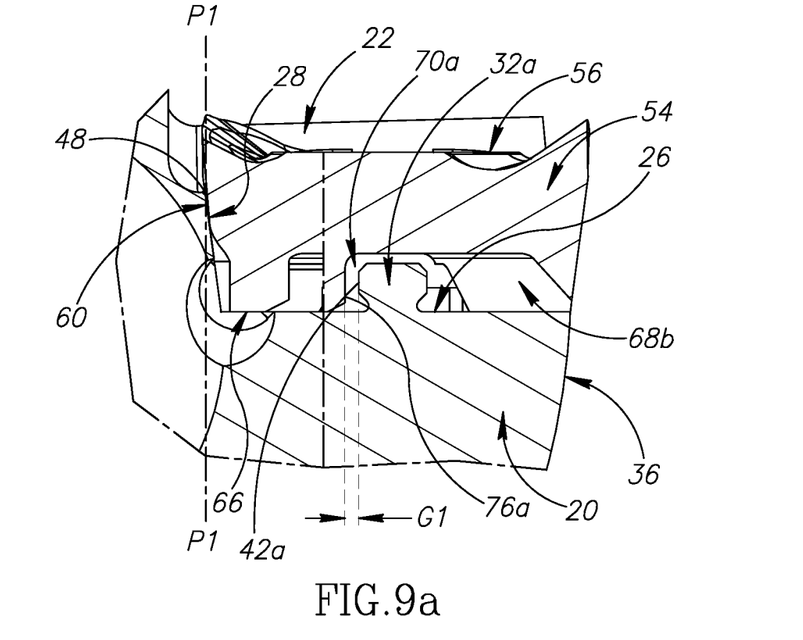
FIG. 9a is a cross-sectional view of the cutting tool shown in FIG. 6, taken along the line IX-IX, in the absence of a radially outward force on the cutting insert.

As shown in FIG. 9a, in the absence of a radially outward force FR on the cutting insert 54, and in a cross-section taken in a third plane P3 perpendicular to the first plane P1 and intersecting the wall edge 48 of the radially outward facing pocket wall 28, the radially outward facing pocket wall 28 may be in contact with the insert's peripheral side surface 60.

In some embodiments of the present invention, the third plane P3 may be coincident with the second plane P2.

Also, as shown in FIG. 9a, in the absence of a radially outward force FR on the cutting insert 54, the at least one radially inward facing abutment surface 42a, 42b may not be in contact with the cutting insert 54.

In some embodiments of the present invention, as shown in FIG. 9a, the at least one radially inward facing abutment surface 42a, 42b may be perpendicular to the seat surface 26.

It should be appreciated that in the absence of a radially outward force FR on the cutting insert 54, as shown in FIG. 9a, there may be a minimum first gap G1 between each of the at least one radially inward facing abutment surface 42a, 42b and its adjacent radial abutting element 70a, 70b.

It should also be appreciated that the minimum first gap G1 may have a range of between 0.05 to 0.20 mm.

It should be further appreciated that FIG. 9a shows the minimum first gap G1 to an exaggerated scale to facilitate understanding of the invention.

In some embodiments of the present invention, in the absence of a radially outward force FR on the cutting insert 54, the at least one radial abutment element 32a, 32b may not be in contact with the cutting insert 54.

Also, in some embodiments of the present invention, in the absence of a radially outward force FR on the cutting insert 54, apart from the radially outward facing pocket wall 28, no portion of the insert receiving pocket 22 may be in contact with the insert's peripheral side surface 60.

Thus, it should be appreciated that in the absence of a radially outward force FR on the cutting insert 54, the axially forward facing pocket wall 34 may be spaced apart from the insert's peripheral side surface 60.

Further, in some embodiments of the present invention, in the absence of a radially outward force FR on the cutting insert 54, no portion of the knob 44 may be in contact with the axial abutment element 68a, 68b occupied thereby.

Figure 10A:
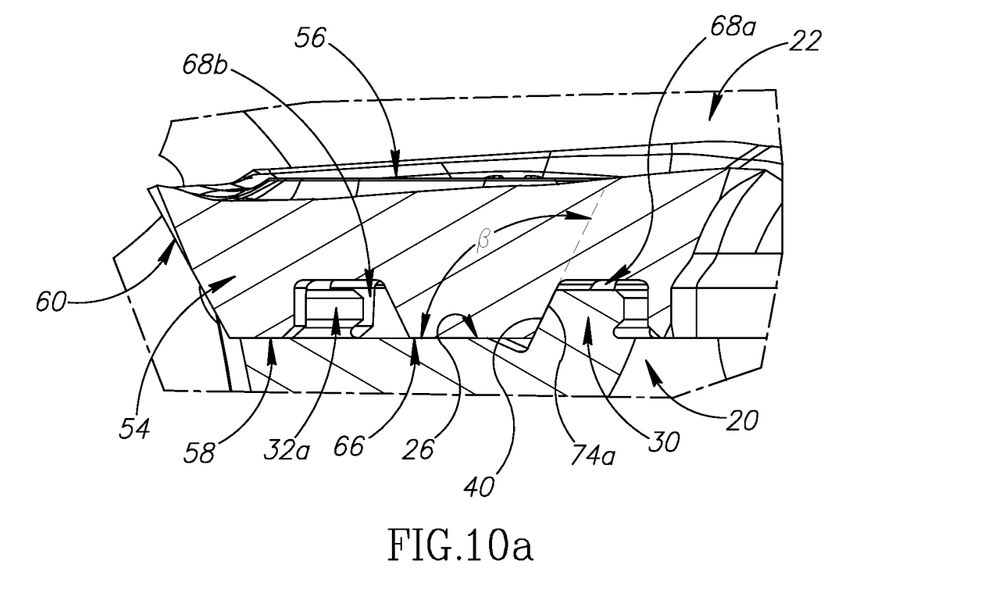
FIG. 10a is a cross-sectional view of the cutting tool shown in FIG. 6, taken along the line X-X, in the absence of a radially outward force on the cutting insert.

As shown in FIG. 10a, in the absence of a radially outward force FR on the cutting insert 54, and in a cross-section taken in a fourth plane P4 intersecting the axial abutment edge 46 of the axially forward facing abutment surface 40, the axially forward facing abutment surface 40 may be in contact with its corresponding axial abutting surface 74a, 74b.

In some embodiments of the present invention, as shown in FIG. 10a, the axially forward facing abutment surface 40 may form an external obtuse abutment angle β with the bore surface 26.

Also, in some embodiments of the present invention, the abutment angle β may be greater than 100 degrees.

For embodiments of the present invention in which the abutment angle β is greater than 100 degrees, it should be appreciated that the axial abutment element 30, and the axial abutting element 68a, 68b in contact therewith, may be advantageously robust.

Figure 9B:
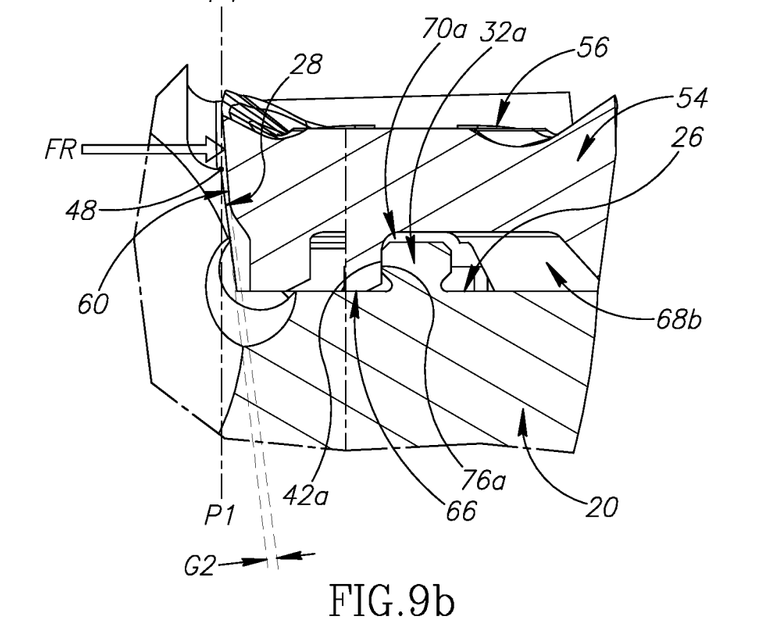
FIG. 9b is a cross-sectional view of the cutting tool shown in FIG. 6, taken along the line IX-IX, in the presence of a sufficiently large radially outward force on the cutting insert.

As shown in FIG. 9b, in the presence of a sufficiently large radially outward force FR on the cutting insert 54, for example, during high speed milling operations at greater than 30,000 revolutions per minute, the cutting insert 54 may undergo repositioning until each of the at least one radially inward facing abutment surface 42a, 42b may be in contact with a corresponding radial abutting surface 76a, 76b of the at least one radial abutting element 70a, 70b.

For embodiments of the present invention in which the insert receiving pocket 22 has at least one radial abutment element 32a, 32b, it should be appreciated that in the presence of a large radially outward forces FR, the cutting insert 54 can be advantageously clamped in its respective insert receiving pocket 22 with a low level of radial displacement, and a magnitude comparable to the minimum first gap G1.

Also, as shown in FIG. 9b, in the presence of a sufficiently large radially outward force FR on the cutting insert 54, and in the cross-section taken in the third plane P3, the radially outward facing pocket wall 28 may not be in contact with the insert's peripheral side surface 60.

It should be appreciated that in the presence of a sufficiently large radially outward force FR on the cutting insert 54, as shown in FIG. 9b, there may be a minimum second gap G2 between the radially outward facing pocket wall 28 and the insert's peripheral side surface 60.

It should also be appreciated that the minimum second gap G2 may have a range of between 0.05 to 0.20 mm.

It should be further appreciated that FIG. 9b shows the minimum second gap G2 to an exaggerated scale to facilitate understanding of the invention.

Figure 10B:
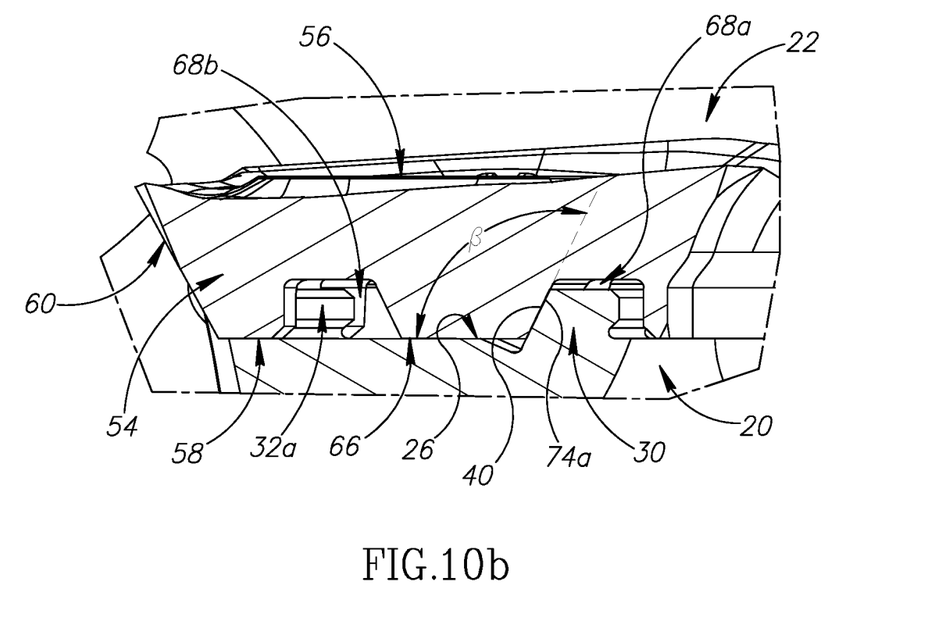
FIG. 10b is a cross-sectional view of the cutting tool shown in FIG. 6, taken along the line X-X, in the presence of a sufficiently large radially outward force on the cutting insert.

It should be yet further appreciated that in the presence of a sufficiently large radially outward force FR on the cutting insert 54, and in the cross-section taken the fourth plane P4, as shown in FIG. 10b, the axially forward facing abutment surface 40 may maintain contact with its corresponding axial abutting surface 74a, 74b.

In some embodiments of the present invention, in the presence of a sufficiently large radially outward force FR on the cutting insert 54, and in a cross-section taken in any plane perpendicular to the first plane P1 and intersecting the radially outward facing pocket wall 28, the radially outward facing pocket wall 28 may not be in contact with the insert's peripheral side surface 60.

Also, in some embodiments of the present invention, in the presence of a sufficiently large radially outward force FR on the cutting insert 54, no portion of the insert receiving pocket 22 may be in contact with the insert's peripheral side surface 60.

Thus, it should be appreciated that in the presence of a sufficiently large radially outward force FR on the cutting insert 54, the axially forward facing pocket wall 34 may be spaced apart from the insert's peripheral side surface 60.

For embodiments of the present invention in which the plurality of abutment elements 30; 32a, 32b include two spaced apart radial abutment elements 32a, 32b, and the plurality of abutting elements 68a, 68b; 70a, 70b include two spaced apart radial abutting elements 70a, 70b, in the presence of a sufficiently large radially outward force FR on the cutting insert 54, two radially inward facing abutment surfaces 42a, 42b of the two radial abutment elements 32a, 32b may be in contact with two corresponding radial abutting surfaces 76a, 76b of the two radial abutting elements 70a, 70b.

Further, in some embodiments of the present invention, in the presence of a sufficiently large radially outward force FR on the cutting insert 54, no portion of the knob 44 may be in contact with its respective axial abutting element 68a, 68b.

For embodiments of the present invention in which no portion of the knob 44 is in contact with its respective axial abutting element 68a, 68b both in the absence of a radially outward force FR and in the presence of a sufficiently large radially outward force FR on the cutting insert 54, it should be appreciated that the knob 44 may not participate with the mounting or positioning of the cutting insert 54 in its respective insert receiving pocket 22, but rather obstruct the entry of cutting chips into the respective axial abutting element 68a, 68b during machining operations, in order to protect the associated non-operative axial abutting surface 74a, 74b.

For embodiments of the present invention in which the axially forward facing pocket wall 34 is spaced apart from the insert's peripheral side surface 60, both in the absence of a radially outward force FR and in the presence of a sufficiently large radially outward force FR on the cutting insert 54, the peripheral side surface 60 may be advantageously configured without constraints relating to axial abutment of the cutting insert 54 in its respective insert receiving pocket 22, thus allowing a wider range of insert shapes compatible with the insert receiving pocket 22, as well as minimal peripheral grinding of these inserts.

Although the present invention has been described to a certain degree of particularity, it should be understood that various alterations and modifications could be made without departing from the spirit or scope of the invention as hereinafter claimed.

What is claimed is:

1. A rotary cutting body (20) having a tool axis (AT) about which the cutting body is rotatable in a direction of rotation (R), comprising:
   at least one insert receiving pocket (22) provided at an axial forward end (24) of the cutting body (20), the insert receiving pocket (22) having:
      a seat surface (26) facing in the direction of rotation (R) and including a threaded bore (38) having a bore axis (Al),
      a radially outward facing pocket wall (28) transverse to the seat surface (26), the pocket wall (28) having a wall edge (48) spaced apart from the seat surface (26),
      a first plane (P1) which is tangential to the wall edge (48), perpendicular to the seat surface (26) and intersects the axial forward end (24) of the cutting body (20), and
      a plurality of male and/or female abutment elements (30; 32a, 32b) associated with the seat surface (26) and including:
         an axial abutment element (30) having an axially forward facing abutment surface (40), the axially forward facing abutment surface (40) having an axial abutment edge (46), and
         at least one radial abutment element (32a, 32b) having a radially inward facing abutment surface (42a, 42b),
      wherein:
         in a top view of the insert receiving pocket (22) along the bore axis (A1):
            the axial abutment edge (46) forms an external acute clamping angle ($\alpha$) with the first plane (P1); and
            the bore axis (Al) is located in the area of the seat surface (26) subtended by the clamping angle ($\alpha$).

2. The rotary cutting body (20) according to claim 1, wherein:
   the plurality of abutment elements (30; 32a, 32b) are elongated, and
   the axial abutment element (30) is transverse to the at least one radial abutment element (32a, 32b).

3. The rotary cutting body (20) according to claim 1, wherein in the top view of the insert receiving pocket (22):
   the axially forward facing abutment surface (40) is entirely located further from the first plane (P1) than the bore axis (Al).

4. The rotary cutting body (20) according to claim 1, wherein in the top view of the insert receiving pocket (22):
   the axially forward facing abutment surface (40) intersects the threaded bore (38).

5. The rotary cutting body (20) according to claim 1, wherein in the top view of the insert receiving pocket (22):
   the at least one radially inward facing abutment surface (42a, 42b) is entirely located closer to the first plane (P1) than the bore axis (Al).

6. The rotary cutting body (20) according to claim 1, wherein in the top view of the insert receiving pocket (22):
   at least one radial abutment edge (50a, 50b) of the at least one radially inward facing abutment surface (42a, 42b) is parallel to the first plane (P1).

7. The rotary cutting body (20) according to claim 1, wherein:
   the plurality of abutment elements (30; 32a, 32b) include two spaced apart radial abutment elements (32a, 32b),
   each radial abutment element (32a, 32b) having a radially inward facing abutment surface (42a, 42b), and
   wherein in the top view of the insert receiving pocket (22):
      the two radial abutment elements (32a, 32b) and their respective radially inward facing abutment surfaces (42a, 42b) are entirely located on opposite sides of a second plane (P2) intersecting the threaded bore (38) and perpendicular to the first plane (P1).

8. The rotary cutting body (20) according to claim 1, wherein:
   the cutting body (20) is cylindrical shaped, having a circumferential wall (36) extending in an axial rearward direction (DR) from the axial forward end (24), and
   the axially forward facing abutment surface (40) intersects the circumferential wall (36).

9. The rotary cutting body (20) according to claim 1, wherein:
   the clamping angle (a) is at least 45 degrees and at most 75 degrees.

10. The rotary cutting body (20) according to claim 1, wherein:
    the axially forward facing abutment surface (40) forms an external obtuse abutment angle ($\beta$) with the seat surface (26), and
    the abutment angle ($\beta$) is greater than 100 degrees.

11. The rotary cutting body (20) according to claim 1, wherein:
    the axial abutment element (30) and one of the at least one radial abutment element (32a, 32b) intersect to form a continuous boomerang-shaped rib (33) on which are formed both the axially forward facing abutment surface (40) and one of the at least one radially inward facing abutment surface (42a, 42b).

12. A rotary cutting tool (52) comprising:
    a rotary cutting body (20) having a tool axis (AT) about which the cutting body is rotatable in a direction of rotation (R), and at least one insert receiving pocket (22) provided at an axial forward end (24) of the cutting body (20), the insert receiving pocket (22) having:
       a seat surface (26) facing in the direction of rotation (R) and including a threaded bore (38) having a bore axis (Al),
       a radially outward facing pocket wall (28) transverse to the seat surface (26), the pocket wall (28) having a wall edge (48) spaced apart from the seat surface (26),
       a first plane (P1) which is tangential to the wall edge (48), perpendicular to the seat surface (26) and intersects the axial forward end (24) of the cutting body (20), and
       a plurality of male and/or female abutment elements (30; 32a, 32b) associated with the seat surface (26) and including:
          an axial abutment element (30) having an axially forward facing abutment surface (40), the axially forward facing abutment surface (40) having an axial abutment edge (46), and
          at least one radial abutment element (32a, 32b) having a radially inward facing abutment surface (42a, 42b),
       wherein in a top view of the insert receiving pocket (22), the axial abutment edge (46) forms an external acute clamping angle (a) with the first plane (P1); and at least one cutting insert (54) removably secured in the at least one insert receiving pocket (22), the cutting insert (54) comprising:
- opposing upper and lower surfaces (56, 58) with a peripheral side surface (60) extending therebetween, and a through bore (62) intersecting the upper and lower surfaces (56, 58) having an insert axis (A2),
- at least one cutting edge (64a, 64b) formed at the intersection of the upper surface (56) and the peripheral side surface (60), and
- the lower surface (58) having a base surface (66) and a plurality of male and/or female abutting elements (68a, 68b; 70a, 70b) associated with the base surface (66), the plurality of abutting elements (68a, 68b; 70a, 70b) including at least one axial abutting element (68a, 68b) and at least one radial abutting element (70a, 70b), and
- a clamping screw (72) passing through the through bore (62) and threadingly engaging the threaded bore (38), wherein:
- the insert's base surface (66) is in contact with the seat surface (26);
- the at least one radial abutment element (32a, 32b) occupies or is occupied by the at least one radial abutting element (70a, 70b); and
- the axially forward facing abutment surface (40) is in contact with a corresponding axial abutting surface (74a, 74b) of one of the at least one axial abutting element (68a, 68b).

13. The rotary cutting tool (52) according to claim 12, wherein:
the bore axis (A1) is non-coaxial with the insert axis (A2).

14. The rotary cutting tool (52) according to claim 12, wherein:
the plurality of abutting elements (68a, 68b; 70a, 70b) are elongated, and
the at least one axial abutting element (68a, 68b) is transverse to the at least one radial abutting element (70a, 70b).

15. The rotary cutting tool (52) according to claim 12, wherein:
a plurality of cutting inserts (54) are removably secured in an equal number of insert receiving pockets (22).

16. The rotary cutting tool (52) according to claim 12, wherein:
the cutting insert (54) has two spaced apart cutting edges (64a, 64b), and
the cutting insert (54) is indexable about the insert axis (A2).

17. The rotary cutting tool (52) according to claim 12, wherein:
the plurality of abutment elements (30; 32a, 32b) are male-type elements, and
the plurality of abutting elements (68a, 68b; 70a, 70b) are female-type elements.

18. The rotary cutting tool (52) according to claim 17, wherein:
the insert's peripheral side surface (60) comprises a pair of opposite end surfaces (75) connected to one another by a pair of opposite side surfaces (77); and
the insert's lower surface (58) comprises:
- a single longitudinal groove (71) recessed into the base surface (66), opening out to the opposite end surfaces (75), passing through the through bore (62), and including both of the spaced apart radial abutting elements (70a, 70b);
- a pair of parallel transverse grooves (69a, 69b) recessed into the base surfaces (66), each transverse groove (69a, 69b) opening out to the opposite side surfaces (77), avoiding the through bore (62), and comprising a respective one of the radial abutting elements (68a, 68b);
- wherein the single longitudinal groove (71) intersects each of the transverse grooves (69a, 69b) and forms an acute groove angle (γ) therewith, the acute groove angle (γ) being at least 45 degrees and at most 75 degrees.

19. The rotary cutting tool (52) according to claim 12, wherein:
in the absence of a radially outward force (FR) on the cutting insert (54), the at least one radially inward facing abutment surface (42a, 42b) is not in contact with the cutting insert (54), and in a cross-section taken in a third plane (P3) perpendicular to the first plane (P1) and intersecting the wall edge (48) of the radially outward facing pocket wall (28), the radially outward facing pocket wall (28) is in contact with the insert's peripheral side surface (60), and
in the presence of a sufficiently large radially outward force (FR) on the cutting insert (54), each of the at least one radially inward facing abutment surface (42a, 42b) is in contact with a corresponding radial abutting surface (76a, 76b) of the at least one radial abutting element (70a, 70b), and in the cross-section taken in the third plane (P3), the radially outward facing pocket wall (28) is not in contact with the insert's peripheral side surface (60).

20. The rotary cutting tool (52) according to claim 12, wherein:
in the absence of a radially outward force (FR) on the cutting insert (54), apart from the radially outward facing pocket wall (28), no portion of the insert receiving pocket (22) is in contact with the insert's peripheral side surface (60).

21. The rotary cutting tool (52) according to claim 12, wherein:
in the presence of a sufficiently large radially outward force (FR) on the cutting insert (54), and in a cross-section taken in any plane perpendicular to the first plane (P1) and intersecting the radially outward facing pocket wall (28), the radially outward facing pocket wall (28) is not in contact with the insert's peripheral side surface (60).

22. The rotary cutting tool (52) according to claim 12, wherein:
in the presence of a sufficiently large radially outward force (FR) on the cutting insert (54), no portion of the insert receiving pocket (22) is in contact with the insert's peripheral side surface (60).

23. A single-sided milling insert (54), comprising:
opposing upper and lower surfaces (56, 58) with a peripheral side surface (60) extending therebetween, the lower surface 58) having a base surface (66);
the peripheral side surface (60) comprises a pair of opposite end surfaces (75) connected to one another by a pair of opposite side surfaces (77);
two spaced apart cutting edges (64a, 64b) formed at the intersection of the upper surface (56) and the peripheral side surface (60), and a through bore (62) intersecting the upper and lower surfaces (56, 58) and having an insert axis (A2) about which the cutting insert is indexable, a plurality of female abutting elements (68*a*, 68*b*; 70*a*, 70*b*) associated with the base surface (66), and including two spaced apart axial abutting elements (68*a*, 68*b*) and two spaced apart radial abutting elements (70*a*, 70*b*), wherein the insert's lower surface (58) comprises:
- a single longitudinal groove (71) recessed into the base surface (66), opening out to the opposite end surfaces (75), passing through the through bore (62), and including both of the spaced apart radial abutting elements (70*a*, 70*b*);
- a pair of parallel transverse grooves (69*a*, 69*b*) recessed into the base surface (66), each transverse groove (69*a*, 69*b*) opening out to the opposite side surfaces (77), avoiding the through bore (62), and comprising a respective one of the radial abutting elements (68*a*, 68*b*);
- wherein the single longitudinal groove (71) intersects each of the transverse grooves (69*a*, 69*b*) and forms an acute groove angle ($\gamma$) therewith, the acute groove angle ($\gamma$) being at least 45 degrees and at most 75 degrees.

24. A rotary cutting tool (52) comprising:

a rotary cutting body (20) having a tool axis (AT) about which the cutting body is rotatable in a direction of rotation (R), and at least one insert receiving pocket (22) provided at an axial forward end (24) of the cutting body (20); and a cutting insert in accordance with claim 23 removably secured in the at least one insert receiving pocket (22).

\* \* \* \* \*